Feb. 15, 1927.  
J. FRUMVELLER  
1,617,587  
FLEXIBLE PIPE CONNECTION  
Original Filed Sept. 2, 1924    2 Sheets-Sheet 1
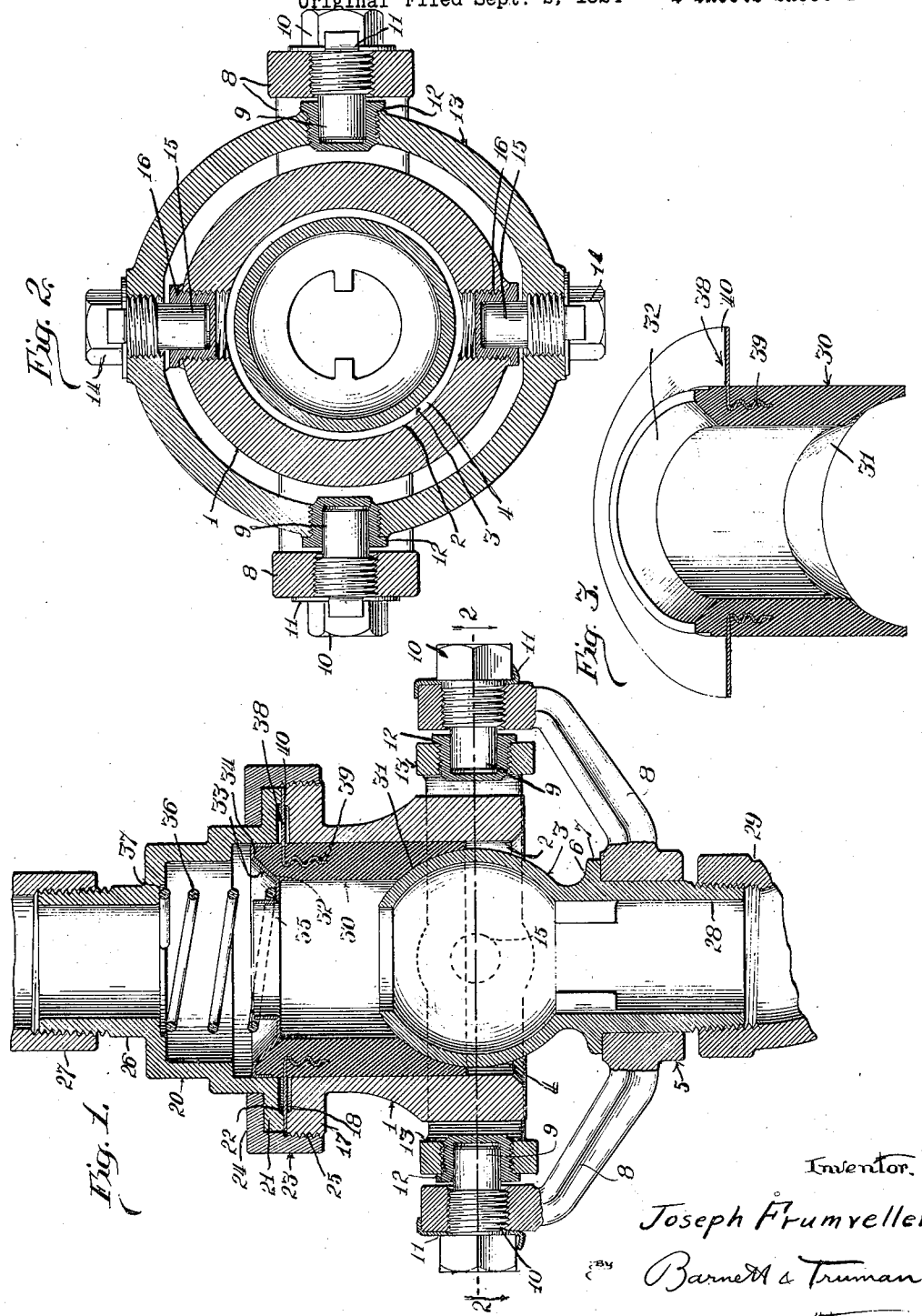
Inventor.  
Joseph Frumveller  
By Barnett & Truman  
Attorneys.

Feb. 15, 1927.　　　　J. FRUMVELLER　　　　1,617,587
FLEXIBLE PIPE CONNECTION
Original Filed Sept. 2, 1924　　2 Sheets-Sheet 2
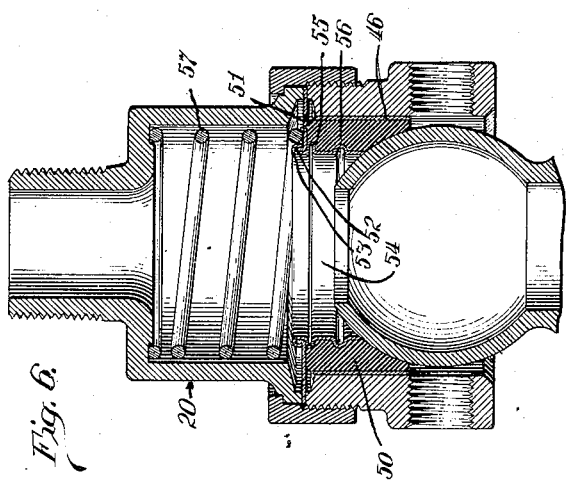
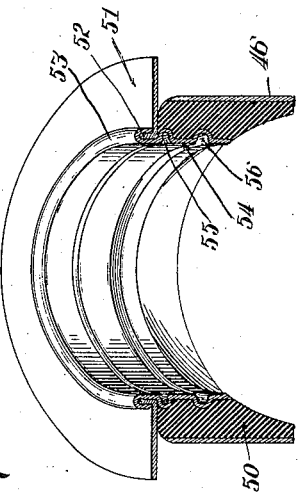
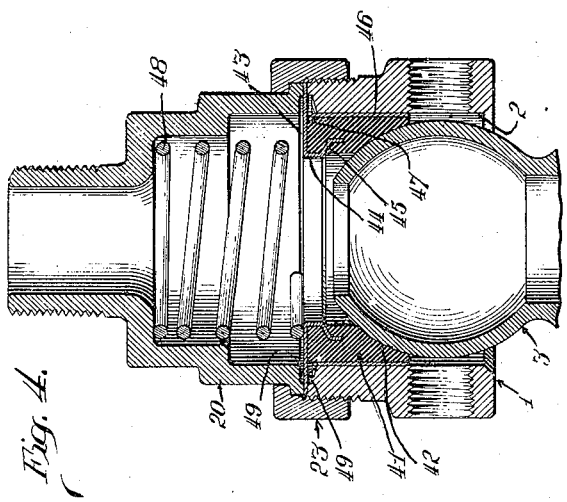
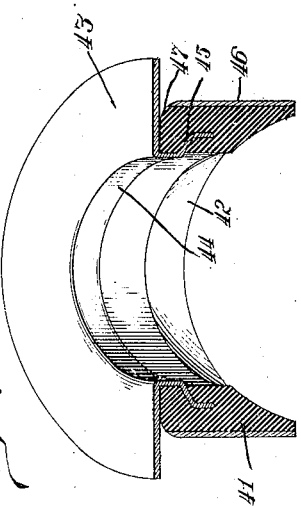
Inventor.
Joseph Frumveller
By Barnett & Truman
Attorneys Patented Feb. 15, 1927.

1,617,587

UNITED STATES PATENT OFFICE.

JOSEPH FRUMVELLER, OF PULLMAN, ILLINOIS, ASSIGNOR TO VAPOR CAR HEATING COMPANY, INC., OF CHICAGO, ILLINOIS, A CORPORATION OF NEW YORK.

FLEXIBLE PIPE CONNECTION.

Application filed September 2, 1924, Serial No. 735,471. Renewed January 16, 1926.

My invention relates to a flexible pipe joint of the type comprising a socket member and a ball member arranged within and spaced slightly from the wall of the socket member, and the object is to provide an improved sealing device adapted to be interposed between the socket member and the inner end of the ball member for making the joint fluid-tight at all times.
The invention is intended particularly for use as a part of a flexible pipe connection between the steam or air pipes of adjacent cars of a railway train. Such a pipe connection must be freely flexible to allow for the relative angular movement of the two cars, and at the same time must maintain a fluid-tight joint. These sealing devices customarily embody a gasket, longitudinally adjustable within the socket member, and bearing against the inner end of the ball member. There are constant vibratory movements between the two members of the joint which tend to wear down the gasket, particularly the surface thereof bearing against the ball.
The fluid pressure in the joint tends to force the gasket as a wedge, into the space between the ball and socket so that wear is taken up automatically.

My present invention seeks to provide a simple and economical sealing device, for use in a pipe joint of this type, which is automatically adjustable to take up wear and to accommodate itself to the vibratory movements of the ball and socket relative to one another, and which will still provide a tight joint at all times.

Another object of the invention is to provide means for holding the gasket in contact with the ball and socket members when the joint is not under fluid pressure.

More specifically my improved sealing device consists of a substantially cylindrical, hollow gasket member adapted to slide longitudinally through the socket member, and curved at its inner end to fit against the ball. A flexible metallic diaphragm is connected between the rear portion of the gasket and the socket member, thus providing a fluid-tight joint between these parts, but still allowing for limited longitudinal movement of the gasket relative to the socket member. A compression spring, mounted within the socket member, and bearing against a follower behind the rear portion of the gasket, assists the fluid pressure within the flexible pipe connection in holding the gasket tightly against the end of the ball at all times.

Other objects and advantages of the invention will be apparent from the following detailed description of several approved forms of apparatus embodying the principles of this invention.

In the accompanying drawing:

Fig. 1 is a central longitudinal section through one of the pipe connections, showing one form of the improved sealing device installed therein.

Fig. 2 is a transverse section substantially on the line 2—2 of Fig. 1.

Fig. 3 is a sectional perspective view through the form of sealing device shown in Fig. 1.

Fig. 4 is a longitudinal central section showing a modified form of sealing device.

Fig. 5 is a sectional perspective view through the sealing device shown in Fig. 4.

Fig. 6 is a longitudinal central section through another modification.

Fig. 7 is a sectional perspective view through the sealing device shown in Fig. 6.

Referring first to Figs. 1, 2 and 3 of the drawings, the pipe connection comprises a socket member 1, having a cylindrical recess or opening 2 therein, and a ball member 3 centered within the outer portion of recess 2 and having a loose working fit in this recess so that a substantial clearance 4 exists between all portions of the ball and the surrounding portion of the socket member. Articulating means are provided to normally support ball member 3 within socket member 1, while at the same time allowing free relative angular and rotative movements between these members. For this purpose, an annular collar 5 is swiveled upon a neck portion 6 of the ball member 3, behind a shoulder 7 projecting outwardly from this neck portion. Arms 8 extending outwardly at diametrically opposite points from the collar 5, project forwardly around the ball member. Pivot studs 9, at the ends of bolts 10, are screwed into the outer ends of arms 8, the studs 9 having common center lines extending through the center of ball 3. Suitable nut blocks 11 maintain the pivot studs in place in the arms 8. Studs 9 are pivoted in bushings 12 of bronze or other suitable bearing metal, screwed into the ring member 13 which loosely surrounds the outer end of socket member 1. The ring 13 is pivoted to the socket member 1 on an axis also passing through the center of ball 3 and at right angles to the axes of the studs 9, as already described. For this purpose, bolts 14 having pivot studs 15 at their inner ends, are screwed into the ring 3 at points spaced 90 degrees from the bushings 12, previously described. Pivot studs 15 are rotatably mounted in bushings 16 screwed into the body of socket member 1. The mechanism just described positively holds the ball member centered within the socket member 1, but permits the ball member to have an universal angular movement, and also allows the ball member to freely rotate.

The socket member 1 is formed of two mating sections, the forward section heretofore described having an outwardly extending flange 17 at its rear end, the rear face of which is centrally cut away, as indicated at 18. The other section 20 of the socket member has a similar outwardly extending flange 21, whose forward face is cut away centrally, as at 22. When this pipe connection is assembled, the flexible metal diaphragm forming part of the sealing device, hereinafter described, is clamped between the outer portions of the flanges 17 and 21. For this purpose, a collar 23, having an inwardly extending flange 24, engaging the rear face of flange 21 is screwed onto the outer periphery of flange 17, as indicated at 25 in Fig. 1. The section 20 of the socket member has a rearwardly extending threaded tubular portion 26 adapted to be engaged with the adjacent end of the flexible piping, and neck portion 6 of the ball member 3 has a corresponding threaded tubular extension 28 adapted to be engaged with another section 29 of the flexible piping.

The sealing device now to be described, forming the principal feature of the present invention, is adapted to maintain a fluid-tight joint between the ball and socket members of the flexible pipe connection at all times, while permitting free angular and rotative movement of the ball member within the socket. The gasket 30, which is formed of a hard rubber composition or similar material, has a cylindrical outer surface adapted to fit snugly within the recess 2 in the socket member and be longitudinally slidable therein. The inner front face of the gasket is curved, as at 31, to fit against the inner end of the ball member 3. The rear end of the gasket is preferably cut away or beveled, as at 32, to accommodate a metallic follower 33, having an outer cylindrical flange 34 enclosing the outer edge of the gasket member. Follower 33 has an inner cylindrical extension 35, serving as a centering device for the compression spring 36 mounted between the follower and a shoulder 37 in section 20 of the socket member.

The gasket 30 is held against the ball member 3, and wedged between the ball member and the surrounding portion of the socket member 1, by the fluid pressure existing within the flexible piping, assisted by the force of spring 36. Spring 36 will hold the sealing member tightly in place, even when the fluid pressure within the pipe is released.

A substantially flat, imperforate, annular, metallic diaphragm 38, has its inner edge embedded within the rear portion of gasket 30, as shown in Figs. 1 and 3. Preferably the inner edge of the diaphragm is provided with a corrugated or otherwise deformed extension 39 to more firmly anchor the diaphragm within the gasket. When this sealing device is assembled within the pipe connection, the outer edge 40 of the diaphragm 38 is firmly clamped between the outer edges of flanges 17 and 21 of the socket member. The cut-away portions 18 and 22 in these flanges 17 and 21, respectively, allow a limited freedom of movement to the flexible body portion of the diaphragm.

As the gasket 30 wears away along its curved surface 31 in engagement with ball 3, it will be forced longitudinally toward the ball by the spring 36 and the fluid pressure within the pipe. The flexible sealing diaphragm 38 will yield, within reasonable limits, to adapt itself to this longitudinal movement of the gasket 30. At the same time, this diaphragm 38 will always maintain an absolutely fluid-tight joint between the gasket and the socket member.

In the modified form of the apparatus, shown in Figs. 4 and 5, the gasket 41 has its forward inner face curved as before, at 42, to engage the inner end of the ball member. The flat flexible diaphragm 43, extends completely across the rear end of gasket 41, and has a short cylindrical flange 44 extending into the open rear end of the gasket and an outwardly flaring skirt 45 embedded within the gasket. A metallic sheathing or casing 46 surrounds the outer cylindrical surface of gasket 41 between the gasket and the socket member. The outer rear edge of the gasket is rounded off, as indicated at 47, to permit greater flexibility of the diaphragm 43. In this device, no follower is required, and the spring 48 bears directly against the inner rear edge of diaphragm 43. In this form of the device, the greater width of the flexible diaphragm 43 permits an increased longitudinal movement of the gasket 41, and if desired, the socket member may be made more compact by wholly or partially omitting the outwardly extending flanges 17 and 21, and clamping the diaphragm directly between the adjacent ends of the sections of the socket member. In Fig. 4, the flange 17 is entirely omitted and the collar 23 screwed directly on to the outer surface of the main portion of socket member 1. The adjacent ends of the sections 1 and 20 are interiorly cut away, as at 49, to increase the flexibility of the diaphragm 43. It is to be understood, that with this form of the invention the socket member might be constructed as shown in Fig. 1, with the outwardly extending flanges 17 and 21, and the diaphragm 43 be made considerably wider than shown in Fig. 4. This would give, as previously noted, an increased range of movement to the gasket 41.

In the modification shown in Figs. 6 and 7, the gasket 50 is much the same in form as gasket 41, shown in Figs. 4 and 5, and has the same outer cylindrical sheathing 46. In this form of the device, the flat metallic diaphragm 51 has a short rearwardly extending cylindrical flange 52 at its inner edge. This flange 52 is clamped within the folded edge portion 53 of a metallic sleeve 54 extending inside the gasket 50. Sleeve 54 is provided with outwardly extending ribs or projections 55 and 56 embedded within the material of gasket 50. This serves to anchor the sleeve and the flexible diaphragm 51 to the gasket. The annular shoulder formed by flange 52 and folded portion 53 of sleeve 54, serves as a centering device for the spring 57, which bears against the inner portion of the diaphragm, as in Figs. 4 and 5. The operation of this form of the device is substantially the same as with the form previously described.

I claim:

1. A flexible pipe connection, comprising a socket member, a ball member articulating means connecting the members, and supporting the ball member for universal movement within but out of contact with the socket member, a gasket longitudinally slidable within the socket member and bearing at one end against the ball, and imperforate annular means connected at its inner and outer edges to the gasket and socket member respectively, allowing limited longitudinal movement of the gasket.

2. A flexible pipe connection, comprising a socket member, a ball member, articulating means connecting the members, and supporting the ball member for universal movement within but out of contact with the socket member, a gasket longitudinally slidable within the socket member and bearing at one end against the ball, and imperforate annular means fixed at its inner and outer edges to the gasket and the socket member respectively but allowing limited longitudinal movement of the gasket.

3. A flexible pipe connection, comprising a socket member, a ball member, articulating means connecting the members, and supporting the ball member for universal movement within but out of contact with the socket member, a gasket longitudinally slidable within the socket member and bearing against the ball, and an annular flexible diaphragm anchored between the gasket and the socket member.

4. A flexible pipe connection, comprising a socket member, a ball member, articulating means connecting the members, and supporting the ball member for universal movement within but out of contact with the socket member, a gasket longitudinally slidable within the socket member and bearing against the ball, and an annular flexible diaphragm secured at its inner edge to the gasket and at the outer edge to the socket.

5. A flexible pipe connection, comprising a socket member, a ball member, articulating means connecting the members, and supporting the ball member for universal movement within but out of contact with the socket member, a gasket longitudinally slidable within the socket member and bearing against the ball, and an annular flexible diaphragm having one edge embedded in the gasket, and secured at the other edge to the socket member.

6. A flexible pipe connection, comprising a socket member, a ball member, articulating means connecting the members, and supporting the ball member for universal movement within but out of contact with the socket member, a gasket longitudinally slidable within the socket member and bearing against the ball, an annular flexible diaphragm secured at one edge to the gasket and at the other edge to the socket, and a spring tending to press the gasket between the ball and socket members.

7. A flexible pipe connection, comprising a socket member, a ball member, articulating means connecting the members, and supporting the ball member for universal movement within but out of contact with the socket member, a gasket longitudinally slidable within the socket member and bearing against the ball, an annular flexible diaphragm having one edge embedded in the gasket, and secured at the other edge to the socket member, and a spring tending to press the gasket between the ball and socket members.

8. A flexible pipe connection, comprising a socket member, a ball member, articulating means connecting the members, and supporting the ball member for universal movement within but out of contact with the socket member, a gasket longitudinally slidable within the socket member and bearing against the ball, and a substantially flat annular diaphragm secured at its outer edge to the socket member and at its inner edge to the gasket.

9. A flexible pipe connection, comprising a socket member, a ball member, articulating means connecting the members, and supporting the ball member for universal movement within but out of contact with the socket member, a gasket longitudinally slidable within the socket member and bearing against the ball, and flexible imperforate annular means anchored between the gasket and the socket member.

10. A flexible pipe connection, comprising a socket member, a ball member, articulating means connecting the members, and supporting the ball member for universal movement within but out of contact with the socket member, a gasket longitudinally slidable within the socket member and bearing at one end against the ball, an annular flexible diaphragm extending across the opposite end of said gasket, the inner edge of the diaphragm being secured to the inner portion of the gasket, and the outer edge of the diaphragm secured to the socket member, and a spring mounted within the socket member and bearing against the diaphragm.

11. A flexible pipe connection, comprising a socket member, a ball member, articulating means connecting the members, and supporting the ball member for universal movement within but out of contact with the socket member, a gasket longitudinally slidable within the socket member and bearing at one end against the ball, and a flexible diaphragm at the opposite end of the gasket, the inner edge portion of the diaphragm being secured to the inner portion of the gasket, and the outer edge of the diaphragm clamped to the socket member.

12. A flexible pipe connection, comprising a socket member formed of separable sections, a ball member, articulating means connecting the members, and supporting the ball member for universal movement within but out of contact with the socket member, a gasket having a slidable fit within the socket and bearing at one end against the ball, and a flexible diaphragm clamped at its outer edge between the sections of the socket member, and secured at its inner edge to the gasket.

13. A flexible pipe connection, comprising a socket member formed of separable sections, a ball member mounted loosely in the socket, connecting means between the members preventing withdrawal of the ball from the socket but permitting universal angular movement thereof, a gasket having a slidable fit within the socket and bearing at one end against the ball, and a flexible diaphragm clamped at its outer edge between the sections of the socket member, and having its inner edge portion embedded in the gasket.

14. A flexible pipe connection, comprising a socket member formed of separable sections, a ball member mounted loosely in the socket, connecting means between the members preventing withdrawal of the ball from the socket but permitting universal angular movement thereof, a gasket having a slidable fit within the socket and bearing at one end against the ball, and a substantially flat annular diaphragm clamped at its outer edge between the sections of the socket member, and secured at its inner edge to the gasket.

15. A flexible pipe connection, comprising a socket member formed of separable sections, a ball member mounted loosely in the socket, connecting means between the members preventing withdrawal of the ball from the socket but permitting universal angular movement thereof, a gasket having a slidable fit within the socket and bearing at one end against the ball, and a substantially flat annular diaphragm clamped at its outer edge between the sections of the socket member, and having its inner edge portion embedded in the gasket.

16. A sealing assembly for use in a flexible pipe connection of the ball and socket type, comprising a substantially cylindrical hollow gasket interiorly curved at one end to engage the ball, and an annular diaphragm having a corrugated flange at its inner edge embedded within the gasket, the outer edge of the gasket adapted to be clamped within the socket member.

17. A sealing assembly for use in a flexible pipe connection of the ball and socket type, comprising a substantially cylindrical hollow gasket interiorly curved at one end to engage the ball, and an annular diaphragm adapted to be clamped at its outer edge to the socket member, and a substantially cylindrical sleeve having ribs engaged within the gasket, and having its outer edge secured to the inner edge of the diaphragm.

18. In a flexible pipe connection, a socket member having a substantially cylindrical recess, a ball member projecting within this recess, articulating means for supporting the ball for universal movement within the recess but out of contact with the socket member, a gasket having a slidable fit within the cylindrical recess and bearing at one end against the ball member, and annular flexible means secured to the gasket at its inner edge and engaging the socket member at its outer edge to seal the joint against the escape of fluid from within the pipe.

19. In a flexible pipe connection, a socket member having a substantially cylindrical recess, a ball member projecting within this recess, articulating means for supporting the ball for universal movement within the recess but out of contact with the socket member, a gasket having a slidable fit within the cylindrical recess and bearing at one end against the ball member, a follower engaging the other end of the gasket, and flexible means secured to the follower and pressing against the socket member to seal the joint.

20. In a flexible pipe connection, a socket member having a substantially cylindrical recess, a ball member projecting within this recess, articulating means for supporting the ball for universal movement within the recess but out of contact with the socket member, a gasket having a slidable fit within the cylindrical recess and bearing at one end against the ball member, a follower having oppositely directed cylindrical flanges at its two ends, one hooked over the rear end of the gasket, and the other serving as a spring centering device, and a spring mounted between the follower and the socket member.

21. A flexible pipe connection, comprising a socket member, a ball member projecting within the socket, articulating means supporting the ball for universal movement within the socket but out of contact therewith, a gasket longitudinally slidable within the socket member and bearing against the ball, and an annular flexible diaphragm anchored to the gasket at its inner edge and engaging the socket at its outer edge.

22. In a flexible pipe joint, the combination of a socket member having a substantially cylindrical recess, a ball member projecting into the recess but out of contact with the socket member, means for articulating the ball and socket members for relative universal movement, a substantially cylindrical gasket slidable within the recess and bearing against the ball, and a flexible metal diaphragm connecting the gasket and socket member to form a fluid seal while permitting longitudinal sliding movement of the gasket within the socket recess.

23. In a flexible pipe joint, the combination of a socket member having a substantially cylindrical recess, a ball member projecting into the recess but out of contact with the socket member, articulating means connecting the ball and socket members for relative universal movement, a gasket slidable within the cylindrical recess and bearing against the ball, and a member formed of flexible sheet material for sealing the joint between the gasket and socket member while permitting longitudinal sliding movement of the gasket within the socket recess.

24. In a flexible pipe joint, the combination of a socket member having a substantially cylindrical recess, a ball member projecting into the recess but out of contact with the socket member, articulating means connecting the ball and socket members for relative universal movement, a gasket slidable within the cylindrical recess and bearing against the ball, and annular means fixedly engaging the gasket and socket members respectively for sealing the joint therebetween while permitting longitudinal movement of the gasket within the socket recess.

JOSEPH FRUMVELLER.